US012701245B2

(12) United States Patent
Shimizu

(10) Patent No.: US 12,701,245 B2
(45) Date of Patent: *Aug. 4, 2026

(54) IMAGE ENCODING METHOD AND IMAGE DECODING METHOD

(71) Applicant: Maxell, Ltd., Kyoto (JP)

(72) Inventor: Takuya Shimizu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/023,410

(22) Filed: Jan. 16, 2025

(65) Prior Publication Data

US 2025/0159216 A1 May 15, 2025

Related U.S. Application Data

(63) Continuation of application No. 17/763,648, filed as application No. PCT/JP2020/035952 on Sep. 24, 2020, now Pat. No. 12,238,308.

(30) Foreign Application Priority Data

Sep. 27, 2019 (JP) ................................. 2019-176410

(51) Int. Cl.
*H04N 19/159* (2014.01)
*H04N 19/176* (2014.01)
*H04N 19/196* (2014.01)

(52) U.S. Cl.
CPC ......... *H04N 19/196* (2014.11); *H04N 19/159* (2014.11); *H04N 19/176* (2014.11)

(58) Field of Classification Search
CPC ... H04N 19/196; H04N 19/159; H04N 19/176
USPC ................................................... 375/240.02
See application file for complete search history.

(56) References Cited

U.S. PATENT DOCUMENTS 9,538,198 B2 * 1/2017 Yasugi ................ H04N 19/196
10,045,043 B2 8/2018 Lee et al.
(Continued)

FOREIGN PATENT DOCUMENTS

JP 2021-027464 A 2/2021
WO 2018/070790 A1 4/2018
(Continued)

OTHER PUBLICATIONS

International Search Report and Written Opinion mailed on Dec. 15, 2020, received for PCT Application PCT/JP2020/035952, Filed on Sep. 24, 2020, 8 pages including English Translation.
(Continued)

*Primary Examiner* — Albert Kir
(74) *Attorney, Agent, or Firm* — XSENSUS LLP

(57) ABSTRACT

More suitable image encoding technique and image decoding technique are provided. An image encoding method for encoding an image includes: a predicted image generation step of generating a predicted image of a synthesis prediction by performing synthesis processing of synthesizing a predicted image of an inter prediction and a predicted image of an intra prediction to an encoding-target block; and an encoding step of encoding a difference between the predicted image generated in the predicted image generation step and a pixel value of an image of the encoding-target block, the synthesizing processing includes weighting processing performed to the predicted image of the inter prediction and the predicted image of the intra prediction, and a weighting parameter of the weighting processing is determined in accordance with a type of the intra prediction.

5 Claims, 8 Drawing Sheets

(56) References Cited

U.S. PATENT DOCUMENTS

| | | | | |
|---|---|---|---|---|
| 10,992,934 | B2 * | 4/2021 | Panusopone | H04N 19/139 |
| 2018/0376148 | A1 | 12/2018 | Zhang et al. | |
| 2018/0376149 | A1 | 12/2018 | Zhang et al. | |
| 2019/0238839 | A1 * | 8/2019 | Ikeda | H04N 19/11 |
| 2019/0379891 | A1 | 12/2019 | Moon et al. | |
| 2020/0162728 | A1 * | 5/2020 | Van der Auwera | H04N 19/593 |
| 2020/0204824 | A1 | 6/2020 | Lai et al. | |
| 2022/0103854 | A1 | 3/2022 | Chiang et al. | |
| 2022/0360767 | A1 * | 11/2022 | Dumas | H04N 19/176 |
| 2023/0379493 | A1 | 11/2023 | Heo et al. | |
| 2024/0195957 | A1 | 6/2024 | Jhu et al. | |

FOREIGN PATENT DOCUMENTS

| | | | |
|---|---|---|---|
| WO | 2018/237295 | A1 | 12/2018 |
| WO | 2023/154359 | A1 | 8/2023 |

OTHER PUBLICATIONS

Xu et al., "Recent advances in video coding beyond the HEVC standard" SIP (2019), vol. 8, Feb. 14, 2019, pp. 1-10.

Chiang et al., "CE10.1.1: Multi-hypothesis prediction for improving AMVP mode, skip or merge mode, and intra mode", Joint Video Experts Team (JVET) of ITU-T SG 16 WP 3 and ISO/IEC JTC 1/SC 29/WG 11, JVET-L0100-v3, Oct. 3-12, 2018, pp. 1-16.

Notice of Reasons for Refusal mailed Nov. 14, 2023, in JP Application No. 2019-176410, 4 pages.

Benjamin Bross et al., "Versatile Video Coding (Draft 5)", Joint Video Experts Team (JVET), Jul. 2, 2019, [JVET-N1001-v10] (version 10), p. 153.

Japanese Office Action issued Jun. 18, 2024, in corresponding Japanese Patent Application No. 2019-176410, 6pp.

* cited by examiner

TYPE OF INTRA PREDICTION

*FIG. 7*

PLANAR PREDICTION

GENERATE PREDICTED IMAGE BY AVERAGING LINEAR INTERPOLATION PIXELS OF (A) AND (B)

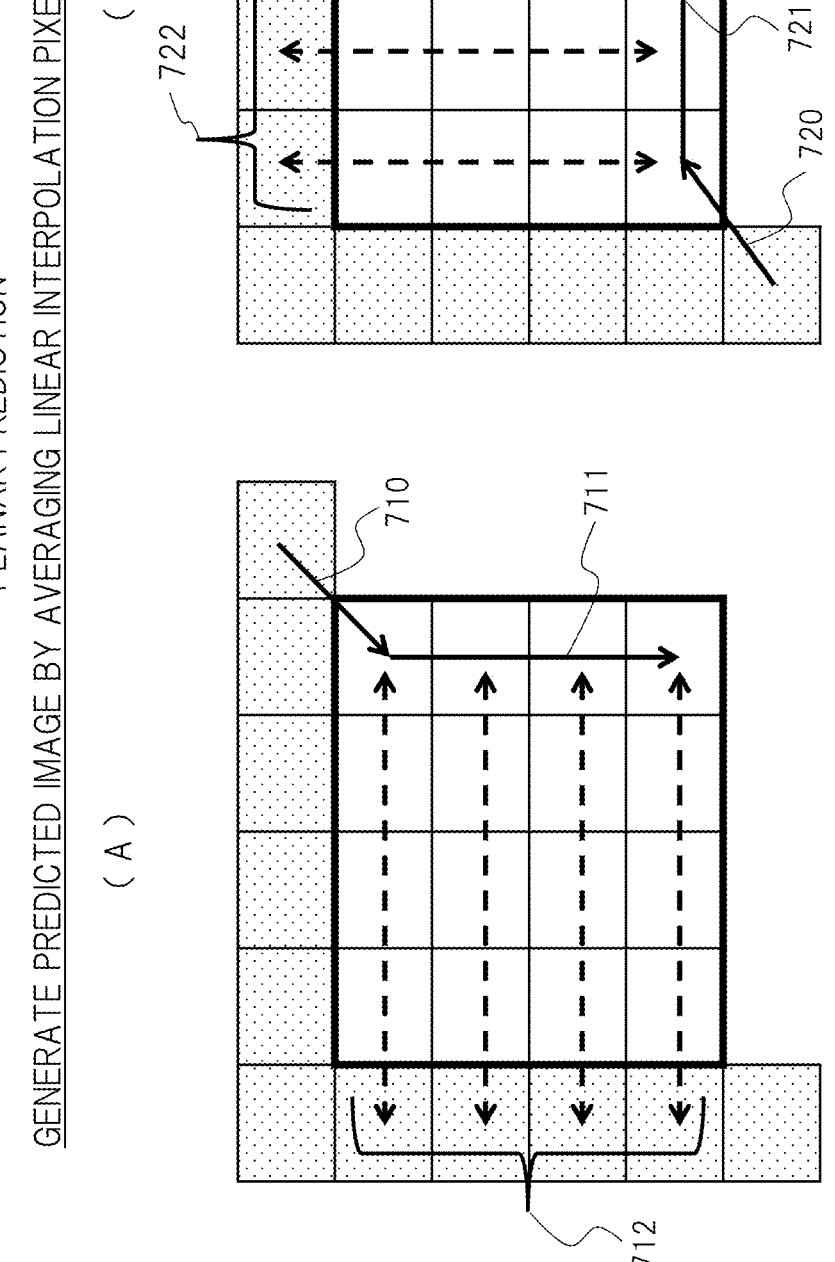

( B )

720 : COPY VALUE OF LOWER LEFT ADJACENT PIXEL
721 : COPY TO BLOCK BOUNDARY TO GENERATE
      REFERENCE PIXEL
722 : PERFORM LINEAR INTERPOLATION USING REFERENCE
      PIXEL AND UPPER ADJACENT PIXEL ( A )

710 : COPY VALUE OF UPPER RIGHT ADJACENT PIXEL
711 : COPY TO BLOCK BOUNDARY TO GENERATE
      REFERENCE PIXEL
712 : PERFORM LINEAR INTERPOLATION USING REFERENCE
      PIXEL AND LEFT ADJACENT PIXEL

*FIG. 8*

DETERMINE "w" IN ACCORDANCE WITH INTRA MODE

| CONDITION EXAMPLE | PLANAR PREDICTION | INTRA PREDICTION IS ANGULAR PREDICTION WHILE PREDICTION DIRECTION IS HORIZONTAL DIRECTION (18) OR VERTICAL DIRECTION (50) | INTRA PREDICTION IS ANGULAR PREDICTION WHILE PREDICTION DIRECTION IS 2 TO 17 OR 51 TO 66 | INTRA PREDICTION IS ANGULAR PREDICTION WHILE PREDICTION DIRECTION IS 19 TO 49 | DC PREDICTION |
|---|---|---|---|---|---|
| w-DETERMINATION EXAMPLE 1 | w=1 | w=3 | w=3 | w=3 | w=3 |
| w-DETERMINATION EXAMPLE 2 | w=1 | w=2 | w=3 | w=3 | w=3 |
| w-DETERMINATION EXAMPLE 3 | w=1 | w=2 | w=2 | w=3 | w=3 |

IMAGE ENCODING METHOD AND IMAGE DECODING METHOD

CROSS-REFERENCE TO RELATED APPLICATIONS

This application is a continuation of U.S. application Ser. No. 17/763,648 filed Mar. 25, 2022, which is based on PCT filing PCT/JP2020/035952, filed Sep. 24, 2020, and claims priority to Japanese Application No. 2019-176410, filed on Sep. 27, 2019, the entire contents of each are incorporated herein by reference.

TECHNICAL FIELD

The present invention relates to an image encoding technique for encoding an image or an image decoding technique for decoding an image.

BACKGROUND ART

As methods of digitizing image and audio information to be data, and recording and transmitting them, H. 264/AVC (Advanced Video Coding), H. 265/HEVC (High Efficiency Video Coding) standards, and the like have been formulated so far. ISO/IEC MPEG and ITU-T VCEG have studied a next-generation method called VVC (versatile video coding) that further achieves compression rates exceeding these methods (see Non-Patent Document 1).

RELATED ART DOCUMENT

Non-Patent Document

Non-Patent Document 1: Xiaozhong Xu and Shan Liu, "Recent advances in video coding beyond the HEVC standard" SIP (2019), vol. 8

SUMMARY OF THE INVENTION

Problems to be Solved by the Invention

As one of VVC technique candidates, use of a predicted image obtained by synthesizing an inter prediction image and an intra prediction image of the same encoding/decoding-target block has been studied.

However, it is not sufficient to reduce the code amount only by using a predicted image obtained by simply averaging and synthesizing the inter prediction image and the intra prediction image.

The present invention has been made in view of the above problems, and an aim of the present invention is to provide a more suitable image encoding technique and image decoding technique.

Means for Solving the Problems

In order to achieve the above-described aim, an embodiment of the present invention may be configured to include, for example: a predicted image generation step of performing synthesis processing of synthesizing a predicted image of an inter prediction and a predicted image of an intra prediction to an encoding-target block to generate a predicted image of a synthesis prediction; and an encoding step of encoding a difference between the predicted image generated in the predicted image generation step and a pixel value of an image of the encoding-target block, the synthesizing processing includes weighting processing performed to the predicted image of the inter prediction and the predicted image of the intra prediction, and a weighting parameter of the weighting processing is determined in accordance with a type of the intra prediction.

Effects of the Invention

According to the present invention, a more suitable image encoding technique and image decoding technique can be provided.

BRIEF DESCRIPTIONS OF THE DRAWINGS

FIG. 7 is an explanatory diagram of an example of a planar prediction according to an embodiment of the present invention; and FIG. 8 is an explanatory diagram of an example of a synthesis prediction processing according to an embodiment of the present invention.

DETAILED DESCRIPTION OF PREFERRED EMBODIMENTS

Hereinafter, embodiments of the present invention will be described with reference to the drawings.

In each drawing, components denoted by the same reference symbol have the same functions.

An expression "0vec" or "0 vector" in each description and each drawing of the present specification indicates a vector in which a value of each component is 0, or transformation or setting into such a vector.

In addition, an expression "not referable" in each description and each drawing of the present specification indicates that information of a block cannot be acquired because a block position is out of a range of a screen or others. An expression "referable" means that information of a block can be acquired, and the information of the block includes information such as a pixel value, a vector, a reference frame number, and/or a prediction mode.

In addition, an expression "residual component" in each description and each drawing of the present specification includes the same meaning as "prediction error".

In addition, an expression "domain" in each description and each drawing of the present specification includes the same meaning as "image".

In addition, an expression "transmission together with a flag" in each description and each drawing of the present specification also includes the meaning of "transmission to be included in the flag".

First Embodiment

Figure 1:
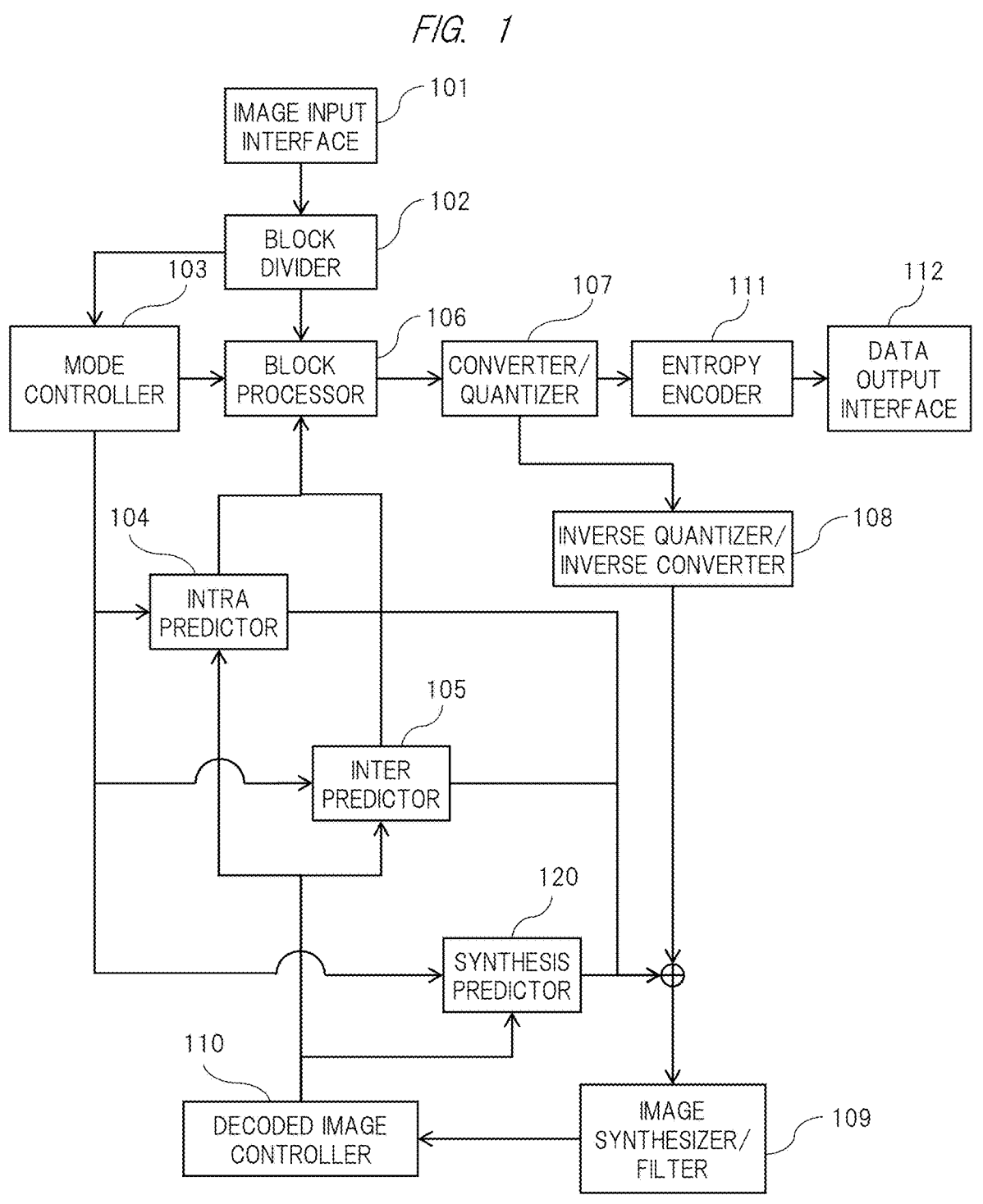
FIG. 1 is an explanatory diagram of an example of an image decoding apparatus according to a first embodiment of the present invention.

First, a first embodiment of the present invention will be described with reference to the drawings. FIG. 1 illustrates an example of a block diagram of an image decoding apparatus according to the first embodiment of the present invention.

The image decoding apparatus includes, for example, an image input interface 101, a block divider 102, a mode controller 103, an intra predictor 104, an inter predictor 105, a synthesis predictor 120, a block processor 106, a converter/quantizer 107, an inverse quantizer/inverse converter 108, an image synthesizer/filter 109, a decoded image controller 110, an entropy encoder 111, and a data output interface 112.

Hereinafter, the operation of each component of the image decoding apparatus will be described in detail.

Note that the operation of each component of the image decoding apparatus may be, for example, an autonomous operation of each component as described below. In addition, for example, the operation may be achieved by cooperating with a controller or software stored in a storage unit.

First, the image input interface 101 acquires and inputs an encoding-target original image. Next, the block divider 102 divides the input original image into blocks of a constant size called coding tree units (CTUs), and further analyzes the input image to divide each CTU into more detailed blocks in accordance with the features thereof. Such a block serving as a unit of the encoding is called coding unit (CU). The division of a CTU into CUs is managed by a tree structure such as a quadtree, a ternary tree, or a binary tree. The inside of the CU may be further divided into a sub-block for prediction or into a TU (transform unit) for frequency transform, quantization, or the like.

The mode controller 103 manages a mode for determining an encoding method of each CU. Encoding processing is performed using a plurality of intra prediction methods, inter prediction methods, and synthesis prediction methods, and a mode that is most efficient for encoding the CU is determined. The most efficient mode is a mode in which the encoding error can be minimized with respect to a constant code amount. There may be a plurality of optimum modes, and the optimum modes may be appropriately selected in accordance with the situation. The determination as to which mode is efficient is performed by combining prediction processing of a plurality of modes by the intra predictor 104, the inter predictor 105, or the synthesis predictor 120, code amount measurement of a residual component and various flags using another processer, and a reproduction image error prediction at the time of decoding. Generally, the mode is determined on a CU basis. However, the CU may be divided into sub-blocks, and the mode may be determined for each of the sub-blocks.

Methods for predicting the encoding-target block (the CU or the sub-block) include an intra (intra-frame) prediction, an inter (inter-frame) prediction, and a synthesis prediction combining the intra prediction and the inter prediction, and these are performed by the intra predictor 104, the inter predictor 105, and the synthesis predictor 120, respectively. The intra prediction uses information of the same frame that is encoded before the encoding-target block, and the inter prediction uses information of a frame that is encoded before the encoding-target frame and that is previous or post in the reproduction time. Here, only one of the intra predictor 104, the inter predictor 105, and the synthesis predictor 120 has been described for the sake of description, but those may be provided for each encoding mode or each frame.

The intra predictor 104 performs intra-screen prediction processing. In the "prediction processing", a predicted image is generated. The intra-screen prediction processing predicts a pixel of the encoding-target block by using the information of the same frame encoded before the encoding-target block. The intra prediction includes a DC prediction, an angular prediction, a planar prediction, a matrix prediction, a cross-component prediction, a multi-line prediction, in-screen block copy, and the like. In the transmission of the intra prediction mode, the highest potential mode is estimated from the intra prediction mode of the encoded block.

The inter predictor 105 performs inter-screen prediction processing. In the "prediction processing", a predicted image is generated. In the inter-screen prediction processing, a pixel of the encoding-target block is predicted by using the information of the frame that is encoded before the encoding-target frame and that is the previous or the post frame in the reproduction time. The inter prediction includes a motion compensation prediction, a merge mode prediction, a prediction by affine transformation, a prediction by triangle block division, an optical flow prediction, a prediction by a decoder side motion prediction, and the like.

The synthesis predictor 120 performs a synthesis prediction for generating a synthesis predicted image obtained by synthesizing the predicted image based on the intra prediction and the predicted image based on the inter prediction. As the predicted image based on the intra prediction used by the synthesis predictor 120, predicted images of various types of intra-screen prediction processing that can be performed by the intra predictor 104 may be used. As the predicted image based on the inter prediction used by the synthesis predictor 120, predicted images of various types of intra-screen prediction processing that can be performed by the inter predictor 105 may be used. Details of the synthesizing method will be described later.

For each encoding-target block, the block processor 106 calculates and outputs a residual component by taking a difference between the original image of the encoding-target block obtained from the block divider 102 and the predicted image based on the intra prediction performed by the intra predictor 104, the predicted image based on the inter prediction performed by the inter predictor 105, or the predicted image based on the synthesis prediction performed by the synthesis predictor 120.

The converter/quantizer 107 performs frequency transform and quantization processing on the residual component that is input from the block processor 106, and outputs a coefficient string. For the frequency transform, a discrete cosine transform (DCT), a discrete sine transform (DST), a product obtained by transforming them to be processable by integer operation, or the like may be used. The coefficient string is transmitted both to a process of reconstructing the image to create a decoded image used for prediction and to a process of outputting data. The transform and quantization may be skipped by designation of the mode.

The inverse quantizer/inverse converter 108 performs inverse quantization and inverse transform on the coefficient string acquired from the converter/quantizer 107 in order to create the decoded image used for prediction, and outputs the restored residual component. The inverse quantization and the inverse transform may be performed in inverse directions of the corresponding quantization and transform of the converter/quantizer, respectively. The inverse quantization and the inverse transform may be skipped by designation of the mode.

The image synthesizer/filter 109 synthesizes the predicted image generated by the intra predictor 104, the predicted image generated by the inter predictor 105, or the predicted image generated by the synthesis predictor 120 with the residual component restored by the inverse quantizer/inverse converter 108, and further performs processing such as a loop filter to generate the decoded image.

The decoded image controller 110 holds the decoded image, and manages an image referred to for the intra prediction, the inter prediction, or the synthesis prediction, mode information, and the like.

The entropy encoder 111 performs entropy encoding processing on the mode information and the coefficient string information, and outputs the processed information as a bit string. As an entropy encoding method, a method such as context adaptive binary arithmetic code (CABAC) may be used. The variable-length code and the fixed-length code may be used in combination. For determination of the context, a predetermined table may be referred to.

The data output interface 112 outputs the encoded data to a recording medium or a transmission path.

Figure 3:
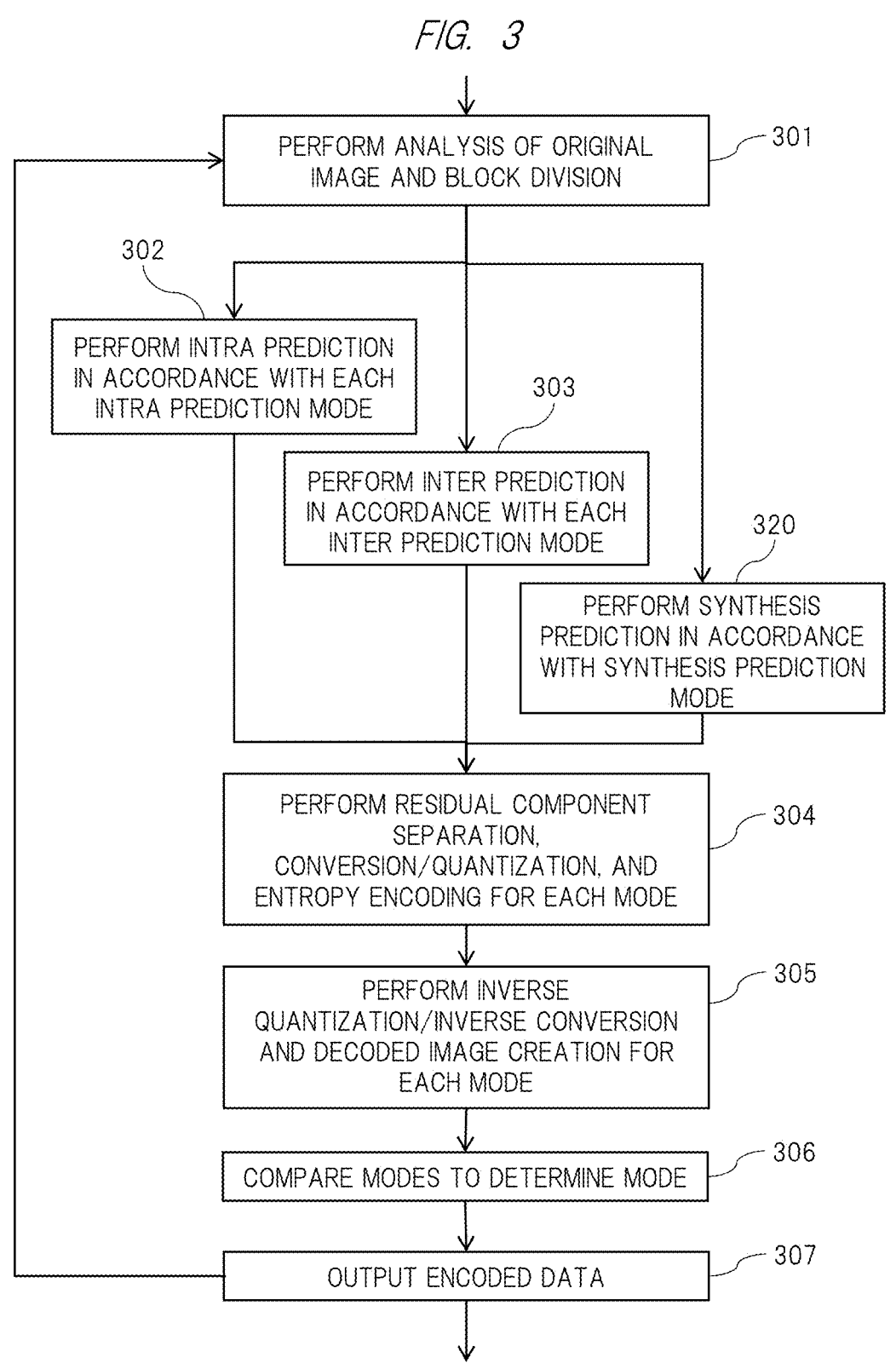
FIG. 3 is an explanatory diagram of an example of an image encoding method according to the first embodiment of the present invention.

Next, a flow of the encoding method in the image decoding apparatus according to the first embodiment of the present invention will be described with reference to FIG. 3.

First, in step 301, the encoding-target original image is input, contents of the image are analyzed to determine the division method, and the image is divided into the blocks. The analysis of the image contents may be performed on the entire image, on combination of a plurality of frames, or in a unit of a block such as a slice, a tile, a brick, and a CTU obtained by dividing the image. In the general block division, the block is divided into the CTUs of a constant size, and then, is divided into the CUs based on the tree structure.

Next, in step 302, the intra prediction is performed on the encoding-target block of the original image acquired in step 301. The intra prediction mode is as described above. The prediction is performed for a plurality of modes in accordance with each intra prediction mode.

Next, in step 303, the inter prediction is performed on the encoding-target block of the original image acquired in step 301. The inter prediction mode is as described above. The prediction is performed for a plurality of modes in accordance with each inter prediction mode.

Next, in step 320, the synthesis prediction is performed on the encoding-target block of the original image acquired in step 301. Details of the synthesis prediction mode will be described later.

Next, in step 304, for each mode, the residual component in the pixel of the encoding-target block that has been subjected to the intra prediction, the inter prediction, and the synthesis prediction is separated, and the transform processing, the quantization processing, and the entropy encoding processing are performed on the residual component to calculate the encoded data.

Next, in step 305, inverse quantization and inverse transform processing are performed for each mode, and the residual component is synthesized with the predicted image to create the decoded image. The decoded image is managed together with the prediction data and various types of the encoded data in the intra prediction and the inter prediction, and is used for prediction of other encoding-target blocks.

Next, in step 306, the modes are compared to determine which mode can be encoded most efficiently. The modes include the intra prediction mode, the inter prediction mode, the synthesis prediction mode, and the like, which are collectively referred to as an encoding mode. The mode selection method is as described above.

In step 307, the encoded data of the encoding-target block is output in accordance with the determined encoding mode. The above-described encoding process of each encoding-target block is repeatedly performed on the entire image, and image encoding is performed.

Next, the synthesis prediction mode according to the present embodiment will be described. As the predicted image generation processing based on the synthesis prediction mode performs, note that the same processing is performed on the encoding side and the decoding side. Therefore, in the following description regarding the synthesis prediction mode according to the present embodiment, the same processing is performed on the encoding side and the decoding side unless otherwise specified.

The synthesis prediction mode according to the present embodiment generates the predicted image based on the synthesis prediction by weighting and averaging the intra prediction image based on the intra prediction and the inter prediction image based on the inter prediction. Specifically, as an inter predicted pixel "Pinter" and an intra predicted pixel "Pintra", each predicted pixel "Pcom" (hereinafter, it is referred to as a prediction synthesis pixel) of the predicted image is calculated by the following Expression 1.

$$Pcom = (w * Pintra + (4 - w) * Pinter)/4 \qquad \text{Expression 1}$$

That is, the processing of Expression 1 is weighting averaging processing of the inter predicted pixel and the intra predicted pixel using "w" that is a weighting parameter. Note that this processing may be expressed as weighting addition.

As the inter prediction image used in the synthesis prediction mode according to the present embodiment, all predicted images based on the inter prediction that can be used in the above-described inter prediction mode may be used as candidates. Among the inter prediction modes described above, only the predicted image in the merge mode may be targeted.

As the intra prediction image used in the synthesis prediction mode according to the present embodiment, all predicted images based on the intra prediction that can be used in the above-described intra prediction mode may be used as candidates. Furthermore, among the intra prediction modes described above, only the predicted images based on the angular prediction, the DC prediction, and the planar prediction may be targeted.

Here, in the synthesis prediction mode according to the present embodiment, the weighting parameter w used for the calculation of the synthesis predicted pixel is determined in accordance with the type of the intra prediction for generating the intra prediction image used in the synthesis prediction mode. That is, a more suitable predicted image is generated by changing the weight of the intra prediction image in the weighting average of the intra prediction image and the inter prediction image in accordance with the features of the different intra predictions.

Hereinafter, a specific example of the determination processing of the weighting parameter w in the synthesis prediction mode according to the present embodiment will be described.

First, the angular prediction, the DC prediction, and the planar prediction, which are the intra predictions included in the candidates used for generating the intra prediction image used in the synthesis prediction mode according to the present embodiment, will be described with reference to FIGS. 6 and 7.

Figure 6:
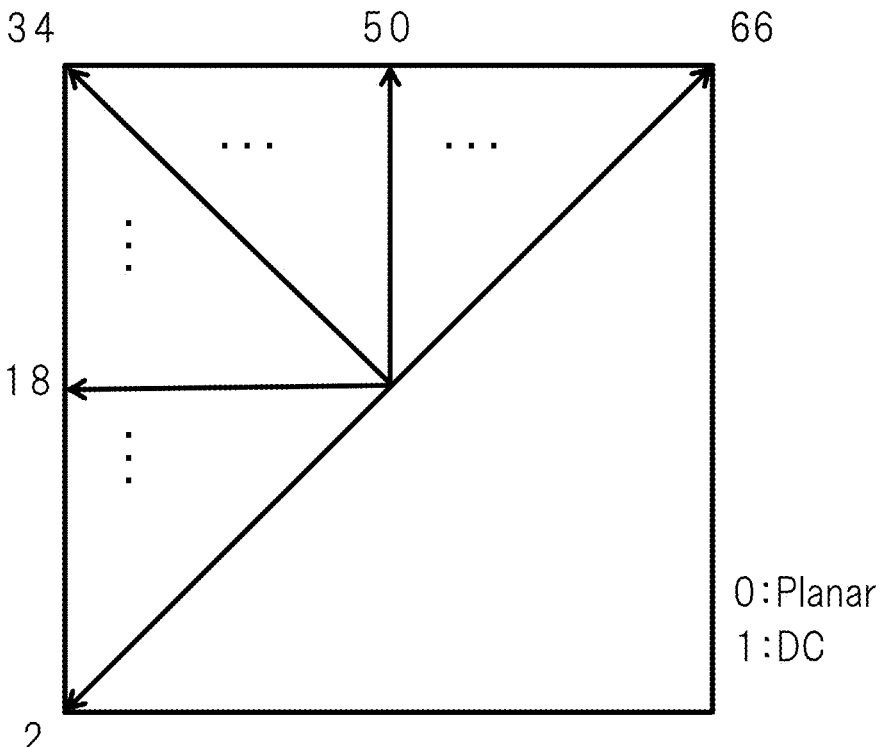
FIG. 6 is an explanatory diagram of an example of types of intra prediction according to an embodiment of the present invention.

FIG. 6 illustrates a prediction direction of the angular prediction. The angular prediction is a prediction method for predicting each prediction-targeting pixel with reference to an adjacent pixel indicated by each prediction direction illustrated in the drawing. The prediction is a one-way prediction, and can also be regarded as prediction of copying an adjacent pixel value in an opposite direction of each prediction direction. The prediction directions each can be identified by a number, and are set as, for example, the illustrated prediction directions 2 to 66. The drawing shows representative prediction directions that are 2 (lower left direction), 18 (left horizontal direction (horizontal direction)), 34 (upper left direction), 50 (upper direction (vertical direction)), and 66 (upper right direction). In this drawing, for the sake of simplicity of explanation, notation of other prediction directions is omitted, but the prediction direction is defined in the clockwise rotation direction every time the prediction direction number increases from the prediction direction 2 to the prediction direction 66. The angular prediction is a one-way prediction based on the adjacent pixel value.

Therefore, the prediction residual tends to be reduced with respect to an image such as a stripe pattern in which a picture pattern extends in a predetermined direction. Reducing the prediction residual means increasing the compression rate. Selecting the angular prediction on the encoding side is made when an image having a small prediction residual in the angular prediction is encoded, and this image is highly possibility the image in which the picture pattern extends in the predetermined direction. Then, selecting the angular prediction for the encoding-target block on the encoding side is highly possibility made when the angular prediction using the same prediction direction as that of the encoding-target block or a prediction direction close to the prediction direction of the encoding-target block is also adopted for the adjacent block. This is because there is a high possibility that the prediction residual becomes small in the angular prediction in the same prediction direction as that of the encoding-target block or the prediction direction close to the prediction direction of the encoding-target block as long as the picture pattern continues to extend in the image in which the picture pattern extends in the predetermined direction. This can also be expressed as having a high possibility of high prediction accuracy.

In this case, there is a high possibility that the angular prediction in the same prediction direction between a plurality of adjacent blocks or the angular prediction in a prediction direction close to this direction is repeatedly selected. That is, it can be said that the angular prediction is the intra prediction having relatively high approximation of the adjacent block regarding the prediction method. The "prediction direction close to the prediction direction of the encoding-target block" may be specifically defined as a prediction direction in which the number of the prediction direction is ±1 of the number of the prediction direction of the encoding-target block. Alternatively, specifically, the prediction direction may be defined as a prediction direction in which the number of the prediction direction is ±2 of the number of the prediction direction of the encoding-target block.

Further, in FIG. 6, the DC prediction number is indicated as 1. The DC prediction is a prediction method for generating a predicted image corresponding to only a DC component in a frequency domain. That is, all the pixel values in the predicted image of the DC prediction are constant values. The DC prediction is a prediction method not based on the adjacent pixel value. However, the image having the tendency capable of reducing the prediction residual in the DC prediction is a planar picture pattern in which constant luminance continues widely or the like. Then, when the DC prediction is selected for the encoding-target block on the encoding side, there is a high possibility that the same DC prediction as that of the encoding-target block is adopted also for the adjacent block. This is because there is a high possibility that the prediction residual becomes small in the same DC prediction as long as the planar picture pattern having the constant luminance is connected in the peripheral direction.

This can also be expressed as having a high possibility of high prediction accuracy. In this case, there is a high possibility that the same DC prediction between a plurality of adjacent blocks is repeatedly selected. That is, although the DC prediction is a prediction method not based on the adjacent pixel value, it can be said that the DC prediction is an intra prediction having relatively high approximation of the adjacent block regarding the prediction method.

Further, in FIG. 6, the planar prediction number is indicated as 0. A specific prediction method of the planar prediction is illustrated in FIG. 7. In the planar prediction, an upper right adjacent pixel of the encoding-target block is used (processing 710) to generate a reference pixel at a right boundary of the encoding-target block (processing 711). Next, each predicted pixel is generated by linear interpolation using this right reference pixel and a left adjacent pixel facing the right reference pixel to generate a first predicted image (FIG. 7(A)) (processing 712).

Furthermore, a lower left adjacent pixel of the encoding-target block is used (processing 720) to generate a reference pixel at a lower boundary of the encoding-target block (processing 721). Next, each predicted pixel is generated by linear interpolation using this lower reference pixel and an upper adjacent pixel facing the lower reference pixel to generate a second predicted image (FIG. 7(B)) (processing 722). Then, the first predicted image (FIG. 7(A)) and the second predicted image (FIG. 7(B)) generated in this manner are averaged to generate a final predicted image. The planar prediction is an intra prediction having a feature in which a predicted image of a nonlinear curved surface is generated by averaging the first predicted image (FIG. 7(A)) and the second predicted image (FIG. 7(B)) generated by the linear interpolation.

The planar prediction is a prediction based on the adjacent pixel value. However, since the predicted image generated by the planar prediction is made of the featured nonlinear curved surface, the approximation of the adjacent block regarding the prediction method is not high at all. As described above, when the prediction residual becomes small in the angular prediction or the DC prediction, there is a high possibility that the same prediction method as that of the adjacent block is repeated. On the other hand, there are not many images having the picture pattern in which the featured nonlinear curved surface of the predicted image of the planar prediction needs to be repeated.

Therefore, it can be said that the planar prediction is an intra prediction having relatively low approximation of the adjacent block regarding the prediction method. In addition, selecting the planar prediction for the encoding-target block on the encoding side is highly possibility made in a case of an image having not a sufficiently small prediction residual in the angular prediction or the DC prediction. Since the image having not the sufficiently small prediction residual in the angular prediction or the DC prediction has a high possibility of not being a simple picture pattern, the prediction residual based on the planar prediction for the image having not the small prediction residual in the angular prediction or the DC prediction is highly possibly larger than the prediction residual in a case of having the small prediction residual in the angular prediction or the DC prediction. This can also be expressed as having a high possibility of low prediction accuracy.

As described with reference to FIGS. 6 and 7, the angular prediction, the DC prediction, and the planar prediction that can be used in the synthesis prediction mode according to the present embodiment are the intra predictions having different features from one another. Therefore, in the synthesis prediction mode according to the present embodiment, control is performed to determine the value of the weighting parameter w of Expression 1 in accordance with the type of the intra prediction while focusing on such a feature for each type of the intra prediction. The w determination processing in the synthesis prediction mode according to the present embodiment will be described with reference to FIG. 8.

FIG. 8 illustrates w-determination examples in the synthesis prediction mode according to the present embodiment. FIG. 8 illustrates three examples of w-determination example 1, w-determination example 2, and w-determination example 3. These are different determination method examples. In each determination method, the "w" value is determined from any one of 1, 2, and 3 for each condition. In Expression 1, the larger the w value is, the larger the weighting of the intra prediction in the synthesis prediction mode is. Conversely, in Expression 1, the smaller the w value is, the smaller the weighting of the intra prediction in the synthesis prediction mode is. Hereinafter, these determination examples will be described.

In the w-determination example 1, when the intra prediction used in the synthesis prediction mode is the planar prediction, "w=1" is determined. When the intra prediction used in the synthesis prediction mode is the angular prediction while the prediction direction is the horizontal direction (18) or the vertical direction (50), "w=3" is determined. When the intra prediction used in the synthesis prediction mode is the angular prediction while the prediction direction is 2 to 17 or 51 to 66, "w=3" is determined. When the intra prediction used in the synthesis prediction mode is the angular prediction while the prediction direction is 19 to 49, "w=3" is determined. When the intra prediction used in the synthesis prediction mode is the DC prediction, "w=3" is determined.

That is, in the w-determination example 1, the planar prediction which is the intra prediction having relatively low approximation of the adjacent block regarding the prediction method is a determination method that can take a smaller w value than those of the angular prediction and the DC prediction. The predicted image of the planar prediction is made of the featured nonlinear curved surface, and the prediction accuracy is highly possibly low, and therefore, it can be also expressed that it is preferable to take the smallest weighting in the synthesis prediction mode.

On the other hand, in the w-determination example 1, in the angular prediction which is the intra prediction having relatively high approximation of the adjacent block regarding the prediction method, 3 which is the larger w value than the w value of the planar prediction is selected in any prediction direction. The angular prediction which is the intra prediction having relatively high approximation of the adjacent block regarding the prediction method is a determination method that can take a larger w value than that of the planar prediction. The predicted image of the angular prediction is made of a simple one-way prediction surface, and the prediction accuracy is highly possibly high, and therefore, it can be also expressed that it is preferable to take relatively large weighting in the synthesis prediction mode.

In addition, in the w-determination example 1, in the DC prediction which is the intra prediction having relatively high approximation of the adjacent block regarding the prediction method, 3 which is the larger w value than the w value of the planar prediction is selected. The DC prediction which is the intra prediction having relatively high approximation of the adjacent block regarding the prediction method is a determination method that can take a larger w value than that of the planar prediction. The predicted image of the DC prediction is made of a simple plane having a constant value, and the prediction accuracy is highly possibly high, and therefore, it can be also expressed that it is preferable to take relatively large weighting in the synthesis prediction mode.

As described above, in the w-determination example 1, the w value is determined in accordance with the type of the intra prediction. In this case, the planar prediction is set to be able to have the smallest value. In the angular prediction, the w value is set to be constant in any prediction direction. That is, in the w-determination example 1, the w value does not change in accordance with the prediction direction of the angular prediction.

Next, in the w-determination example 2, when the intra prediction used in the synthesis prediction mode is the planar prediction, "w=1" is determined. When the intra prediction used in the synthesis prediction mode is the angular prediction while the prediction direction is the horizontal direction (18) or the vertical direction (50), "w=2" is determined. When the intra prediction used in the synthesis prediction mode is the angular prediction while the prediction direction is 2 to 17 or 51 to 66, "w=3" is determined. When the intra prediction used in the synthesis prediction mode is the angular prediction while the prediction direction is 19 to 49, "w=3" is determined. When the intra prediction used in the synthesis prediction mode is the DC prediction, "w=3" is determined.

That is, in the w-determination example 2, as similar to the w-determination example 1, the planar prediction which is the intra prediction having relatively low approximation of the adjacent block regarding the prediction method is a determination method that can take a smaller w value than those of the angular prediction and the DC prediction. The reason is the same as in the w-determination example 1. In the w-determination example 2, in the angular prediction which is the intra prediction having relatively high approximation of the adjacent block regarding the prediction method, 2 or 3 which is the larger w value than the w value of the planar prediction is selected in any prediction direction. The angular prediction which is the intra prediction having relatively high approximation of the adjacent block regarding the prediction method is a determination method that can take a larger w value than that of the planar prediction.

The predicted image of the angular prediction is made of a simple one-way prediction surface, and the prediction accuracy is highly possibly high, and therefore, it can be also expressed that it is preferable to take relatively large weighting in the synthesis prediction mode. However, as different from the w-determination example 1, the w-determination example 2 changes the w value in accordance with the prediction direction even in the same angular prediction.

Specifically, when the prediction direction is the horizontal direction (18) or the vertical direction (50), "w=2" is set, and the weighting is set to be lower than "w=3" in other prediction directions in the angular prediction. This is because it is conceivable that the prediction direction as the horizontal direction (18) is only in the case of the pixel of the left adjacent block as the reference pixel, and the approximation of the adjacent block regarding the prediction method is highly possibly limited to the left adjacent block, and therefore, the overall approximation of the adjacent block regarding the prediction method is lower than those in other prediction directions.

Furthermore, similarly, this is because it is conceivable that the prediction direction as the vertical direction (50) is only in the case of the pixel of the upper adjacent block as the reference pixel, and the approximation of the adjacent block regarding the prediction method is highly possibly limited to the upper adjacent block, and therefore, the overall approximation of the adjacent block regarding the prediction method is lower than those in other prediction directions. Further, in the w-determination example 2, as similar to the w-determination example 1, in the DC prediction which is the intra prediction having relatively high approximation of the adjacent block regarding the prediction method, 3 which is the larger w value than the w value of the planar prediction is selected. The reason is the same as in the w-determination example 1.

As described above, in the w-determination example 2, the w value is determined in accordance with the type of the intra prediction. Furthermore, in a case where the intra prediction is the angular prediction, the w value is determined in consideration of the prediction direction. In addition, the w value is set so that the planar prediction can be the smallest value.

The w-determination example 3 is different from the w-determination example 2 in that "w=2" is determined when the intra prediction used in the synthesis prediction mode is the angular prediction while the prediction direction is 2 to 17 or 51 to 66, but is in common with the same in other points. In the case of the prediction direction 2 to 17 or 51 to 66 in the angular prediction, an angle of the prediction direction is neither completely the horizontal direction nor the vertical direction, and therefore, the approximation regarding the prediction method is recognized for both the upper adjacent block and the left adjacent block.

However, the pixel included in the reference pixel is either the pixel of the upper adjacent block or the pixel of the left adjacent block. The case of the prediction direction 2 to 17 or 51 to 66 has a possibility of the lower overall approximation of the adjacent block regarding the prediction method than that of the case of the prediction direction 19 to 49 in which both the pixel of the upper adjacent block and the pixel of the left adjacent block are included in the reference pixel. Therefore, in the w-determination example 3, "w=2" is determined in the case of the prediction direction 2 to 17 or 51 to 66 so that the weighting is made smaller than that in the case of the prediction direction 19 to 49.

According to the above-described w-determination examples in the synthesis prediction mode of FIG. 8, it is possible to more suitably determine the weighting of the intra prediction image in the synthesis of the intra prediction image and the inter prediction image in accordance with the feature of each type of the intra prediction used in the synthesis prediction mode.

As described above, the coding processing according to an embodiment of the present application is performed.

According to the above-described image decoding apparatus and the above-described image encoding method according to the first embodiment, a more suitable synthesis prediction mode can be achieved.

Furthermore, the image decoding apparatus and the image encoding method according to the first embodiment are applicable to a recording device, a mobile phone, a digital camera, or the like using them.

According to the above-described image decoding apparatus and the above-described image encoding method according to the first embodiment of the present invention, it is possible to reduce the code amount of the encoded data to prevent deterioration of the image quality of the decoded image in the decoding of the encoded data. That is, a high compression rate and a better image quality can be achieved.

That is, according to the image decoding apparatus and the image encoding method according to the first embodiment of the present invention, a more suitable image encoding technique can be provided.

Second Embodiment

Figure 2:
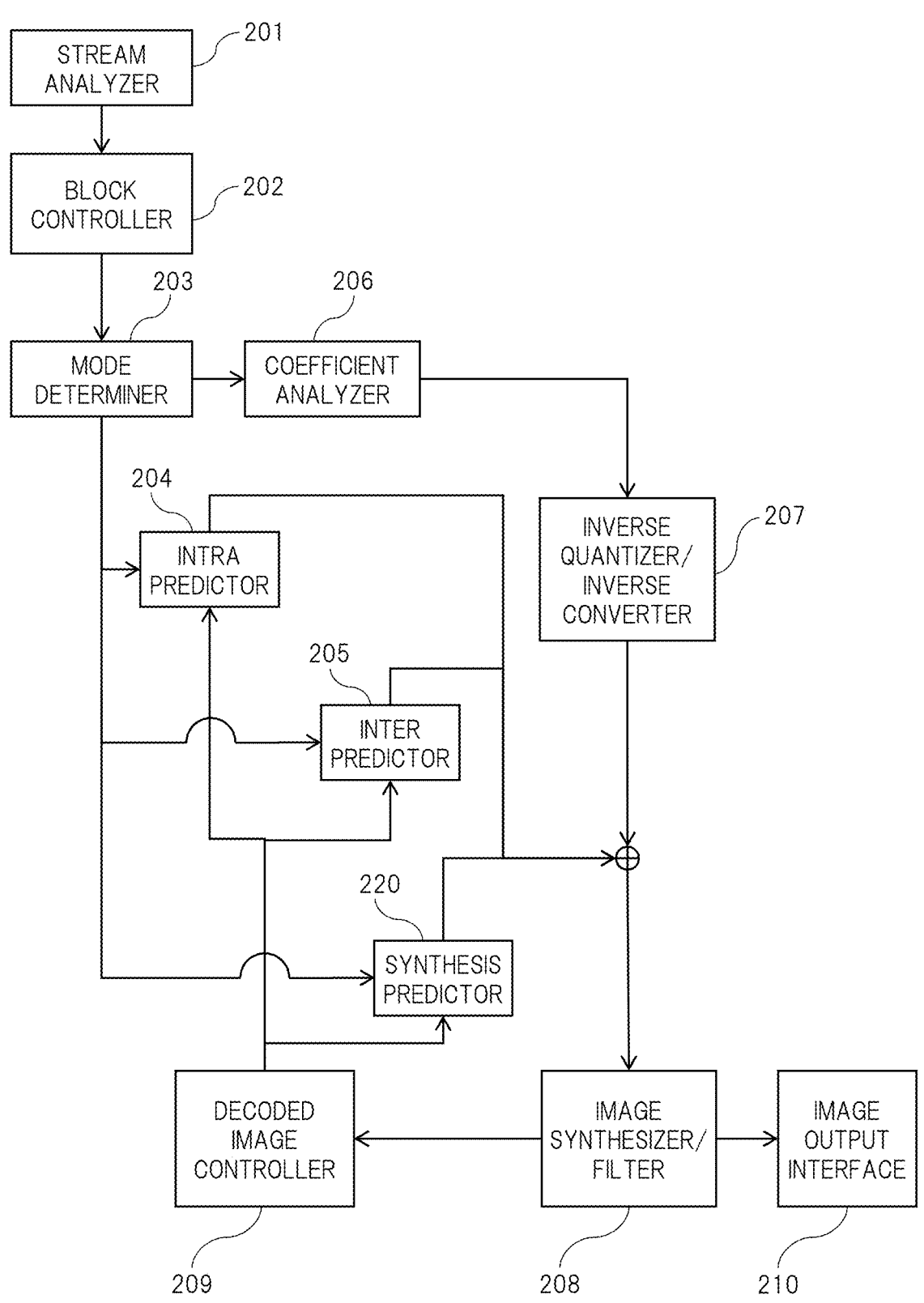
FIG. 2 is an explanatory diagram of an example of an image decoding apparatus according to a second embodiment of the present invention.

Next, FIG. 2 illustrates an example of a block diagram of an image decoding apparatus according to a second embodiment of the present invention.

The image decoding apparatus includes, for example, a stream analyzer 201, a block controller 202, a mode determiner 203, an intra predictor 204, an inter predictor 205, a synthesis predictor 220, a coefficient analyzer 206, an inverse quantizer/inverse converter 207, an image synthesizer/filter 208, a decoded image controller 209, and an image output interface 210.

Hereinafter, the operation of each component of the image decoding apparatus will be described in detail.

Note that the operation of each component of the image decoding apparatus may be, for example, an autonomous operation of each component as described below. In addition, the operation of each component may be achieved by, for example, cooperating with a controller or software stored in a storage unit.

First, the stream analyzer 201 analyzes the input encoded stream. Here, the stream analyzer 201 also performs data extraction processing from a packet and information acquisition processing of various headers and flags.

Furthermore, in this case, the encoded stream input to the stream analyzer 201 is, for example, an encoded stream generated by the image decoding apparatus and the image encoding method according to the first embodiment. Since the generation method is as described in the first embodiment, the description thereof will be omitted. The encoded stream may be an encoded stream read from a data recording medium illustrated in a third embodiment. A recording method will be described later.

Next, the block controller 202 manages block processing in accordance with the information of block division analyzed by the stream analyzer 201. Generally, the encoded image is divided into the blocks, and each encoding-target block is managed by the tree structure or the like. The processing order of the blocks is often performed in the order of raster scanning, but the blocks may be processed in an optionally-determined order such as zigzag scanning. The block division method is as described in the first embodiment.

Next, for each encoding-target block, the mode determiner 203 determines the encoding mode designated by the flag or the like. In the following decoding processing, processing corresponding to the encoding mode as the determined result is performed. Hereinafter, processing for each encoding mode will be described.

First, when the encoding mode is the intra encoding, the intra predictor 204 generates the predicted image based on the intra prediction. The intra prediction mode is as described in the first embodiment. In principle, the processing of generating the predicted image based on the prediction is the same between the encoding side and the decoding side.

When the encoding mode is the encoding based on the inter prediction, the inter predictor 205 generates the predicted image based on the inter prediction. The inter prediction mode is as described in the first embodiment. In principle, the processing of generating the predicted image based on the prediction is the same between the encoding side and the decoding side.

When the encoding mode is the encoding based on the synthesis prediction, the synthesis predictor 220 generates the predicted image based on the synthesis prediction. The synthesis prediction mode is as described in the first embodiment. In principle, the processing of generating the predicted image based on the prediction is the same between the encoding side and the decoding side.

On the other hand, the coefficient analyzer 206 analyzes the encoded data of each encoding-target block included in the input encoded stream, decodes the entropy-coded data, and outputs the encoded data including the coefficient string of the residual component. In this case, processing corresponding to the encoding mode as the identification result of the mode determiner 203 is performed.

The inverse quantizer/inverse converter 207 performs inverse quantization processing and inverse transform on the encoded data including the coefficient string of the residual component to restore the residual component. The method of inverse quantization and inverse transform is as described above. The inverse quantization and the inverse transform may be skipped by designation of the mode.

The residual component restored as described above is synthesized with the predicted image output from the intra predictor 204, the inter predictor 205, or the synthesis predictor 220 by the image synthesizer/filter 208, and is further subjected to processing such as a loop filter, and the result is output as the decoded image.

The decoded image controller 209 holds the decoded image, and manages an image referred to for the intra prediction, the inter prediction, or the synthesis prediction, mode information, and the like.

The last decoded image is output by the image output interface 210, and the image is decoded.

Figure 4:
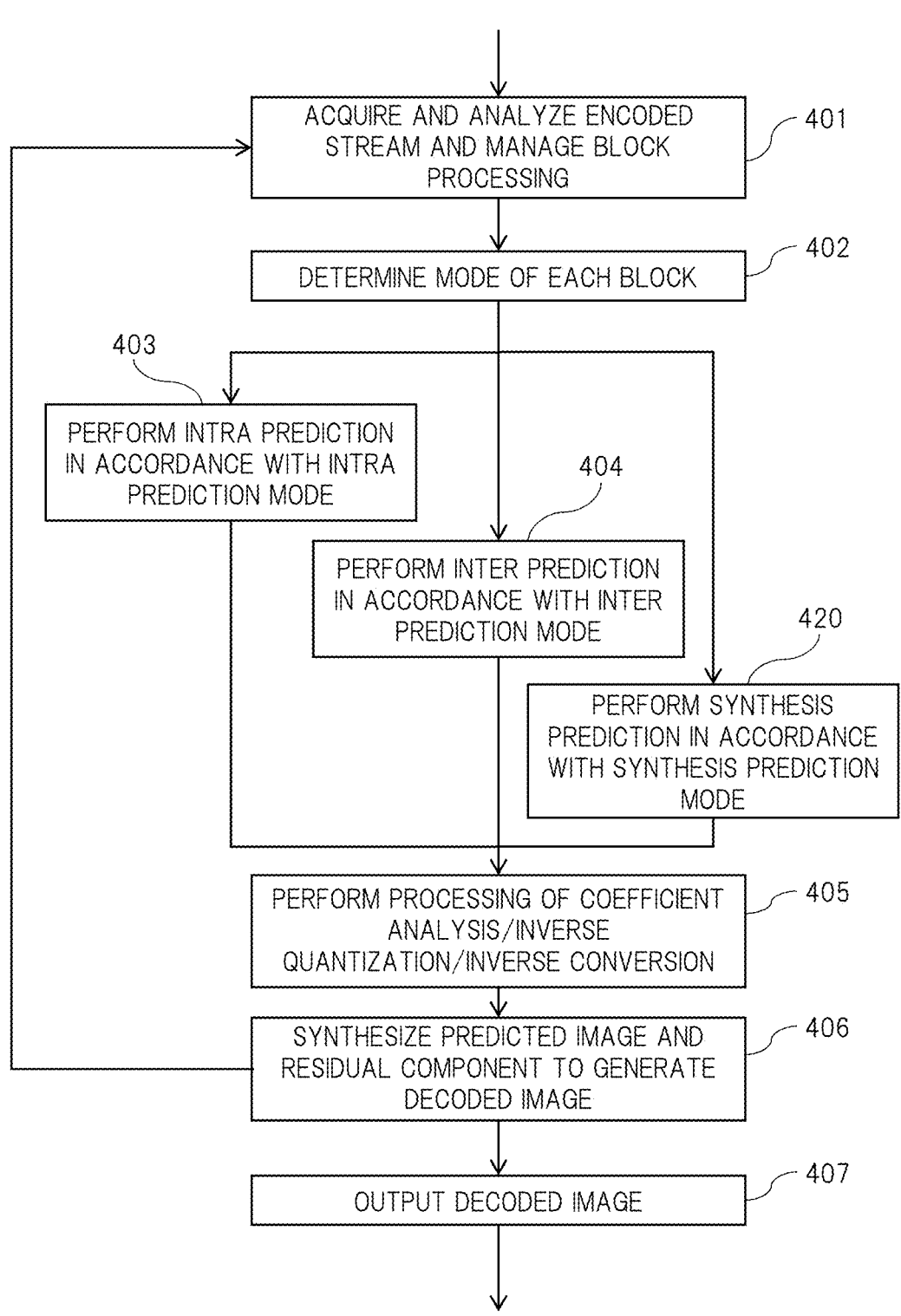
FIG. 4 is an explanatory diagram of an example of an image decoding method according to the second embodiment of the present invention.

Next, a flow of an image decoding method in the image decoding apparatus according to the second embodiment of the present invention will be described with reference to FIG. 4.

First, in step 401, an encoded stream to be a decoding target is acquired, and data is analyzed. In addition, block processing is managed in accordance with the analyzed block division information. The block division method is as described in the first embodiment.

Next, in step 402, the encoding mode of one encoding unit (block unit, pixel unit, or the like) included in the encoded data is determined with reference to the information of the encoding mode analyzed in step 401. Here, the process proceeds to step 403 in the case of the intra encoding mode, the process proceeds to step 404 in the case of the inter encoding mode, and the process proceeds to step 420 in the case of the synthesized encoding mode.

In step 403, the predicted image based on the intra prediction is generated in accordance with the method designated by the encoding mode. The intra prediction mode is as described in the first embodiment.

In step 404, the predicted image based on the inter prediction is generated in accordance with the method designated by the encoding mode. The inter prediction mode is as described in the first embodiment.

In step 420, the predicted image based on the synthesis prediction is generated in accordance with the method designated by the encoding mode. The synthesis prediction mode is as described in the first embodiment.

In step 405, the encoded data of each encoding-target block is analyzed in accordance with the method designated by the encoding mode, the entropy-encoded data is decoded, and the encoded data including the coefficient string of the residual component is output. Further, the inverse quantization processing and inverse transform are performed to the encoded data including the coefficient string of the residual component to restore the residual component. The method of the inverse quantization and the inverse transform is as described above. The inverse quantization and the inverse transform may be skipped by designation of the mode.

In step 406, for each encoding-target block, the restored residual component and the predicted image generated by the intra prediction, the inter prediction, the synthesis prediction, or the like are synthesized, and processing such as a loop filter is further performed to generate the decoded image. The decoded image is generated by performing the decoding process performed in a unit of the encoding-target block to the entire image.

In step 407, the generated decoded image is output and displayed.

The processing of the synthesis prediction mode on the decoding side according to the present embodiment is substantially the same as the processing of the synthesis prediction mode described with reference to Expression 1 and FIGS. 6, 7, and 8 in the first embodiment, and therefore, repeated description will be omitted. The expression "encoding-target block" in the description of the synthesis prediction mode of the first embodiment may be interpreted as "decoding-target block" in the processing of the synthesis prediction mode on the decoding side.

In the synthesis prediction mode on the decoding side according to the present embodiment, as described above, the weighting averaging processing is performed to the inter predicted pixel and the intra predicted pixel with reference to Expression 1. Furthermore, in the synthesis prediction mode on the decoding side according to the present embodiment, as described above, the weighting parameter "w" is determined by determination processing as illustrated in FIG. 8. As a result, in accordance with the feature of each type of the intra prediction used in the synthesis prediction mode, it is possible to more suitably determine the weighting of the intra prediction image in the synthesis of the intra prediction image and the inter prediction image.

Also in the present embodiment, in addition to the example, an encoded stream defined by subdividing each encoding mode while using a size of the block used in the encoding mode or the like as a parameter may be set as a decoding-target stream.

As described above, the decoding processing according to the embodiment of the present application is performed.

Furthermore, the image decoding apparatus and the image decoding method according to the second embodiment are applicable to a reproduction device, a mobile phone, a digital camera, or the like using them.

According to the image decoding apparatus and the image decoding method according to the second embodiment of the present invention described above, the encoded data having the small code amount can be decoded with higher image quality.

That is, according to the image decoding apparatus and the image decoding method according to the second embodiment of the present invention, a more suitable image decoding technique can be provided.

Third Embodiment

Figure 5:
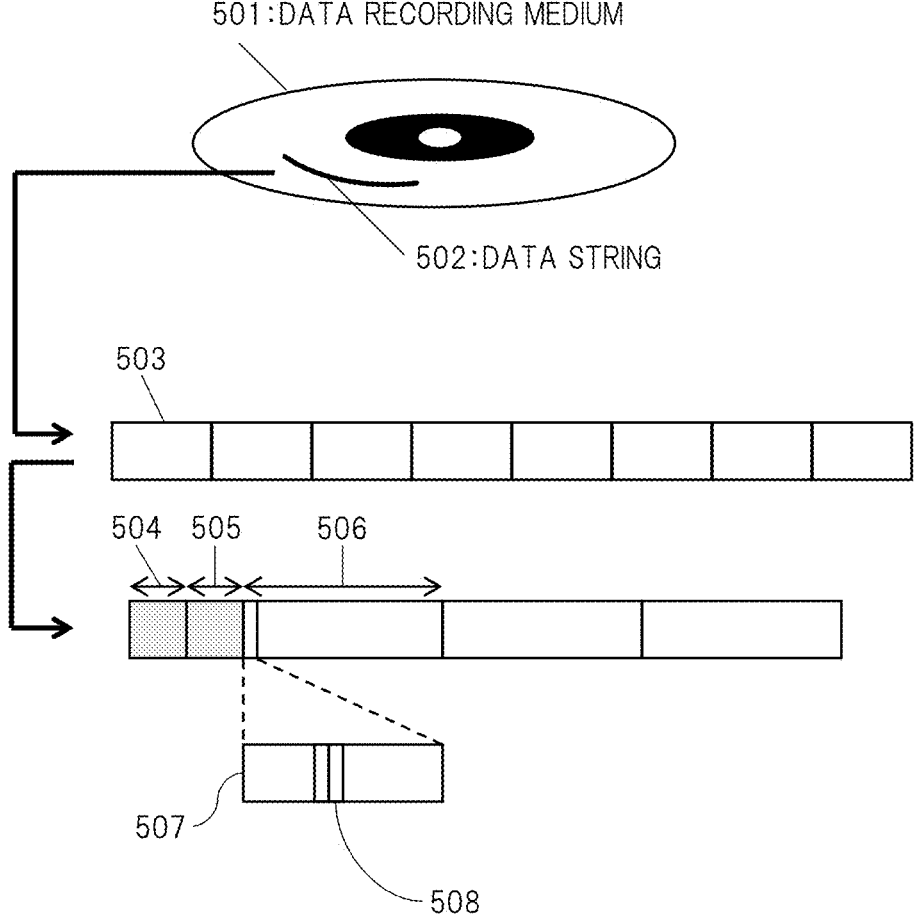
FIG. 5 is an explanatory diagram of an example of a data recording medium according to a third embodiment of the present invention.

Next, FIG. 5 illustrates an example of a data recording medium according to a third embodiment of the present invention.

An encoded stream according to the present embodiment of the present invention is an encoded stream generated by the image decoding apparatus or the image encoding method according to the first embodiment. Since the generation method is as described in the first embodiment, the description thereof will be omitted.

Here, the encoded stream according to the present embodiment is recorded as, for example, a data string 502 on a data recording medium 501. The data string 502 is recorded as, for example, an encoded stream in accordance with a predetermined grammar.

First, the encoded stream is extracted as a bit string that is partitioned in a unit of a constant size called a network abstraction layer (NAL) unit 503. The bit string of the NAL unit is read out in accordance with a certain rule such as a variable length code, and is transformed as a raw byte sequence payload (RBSP). The RBSP data includes slice data 506 and information such as a sequence parameter set 504, a picture parameter set 505, a decoding parameter set, and a video parameter set.

For example, information 507 regarding each block is included in each slice. For example, a domain for recoding the encoding mode for each block exists in the information regarding the block, and this is set as an encoding mode flag 508.

According to the data recording medium according to the third embodiment of the present invention described above, the code amount can be reduced, and the deterioration of the image quality can be prevented. That is, it is possible to achieve a data recording medium that records an encoded stream having a high compression rate and a better image quality.

Any combination of the embodiments such as the drawings and the methods described above can be an embodiment of the present invention.

According to each embodiment of the present invention described above, the code amount can be reduced, and the deterioration of the image quality can be prevented. That is, a high compression rate and a better image quality can be achieved.

EXPLANATION OF REFERENCE CHARACTERS

101 . . . image input interface, 102 . . . block divider, 103 . . . mode controller, 104 . . . intra predictor, 105 . . . inter predictor, 106 . . . block processor, 107 . . . converter/quantizer, 108 . . . inverse quantizer/inverse converter, 109 . . . image synthesizer/filter, 110 . . . decoded image controller, 111 . . . entropy encoder, 112 . . . data output interface, 201 . . . stream analyzer, 202 . . . block controller, 203 . . . mode determiner, 204 . . . intra predictor, 205 . . . inter predictor, 206 . . . coefficient analyzer, 207 . . . inverse quantizer/inverse converter, 208 . . . image synthesizer/filter, 209 . . . decoded image controller, 210 . . . image output interface, 120 . . . synthesis predictor, 220 . . . synthesis predictor

The invention claimed is:

1. An image encoding method for encoding an image, comprising:

a predicted image generation step of generating a predicted image by a plurality of types of predicted image generating processing, the plurality of types of predicted image generating processing include an intra prediction, an inter prediction, and a synthesis prediction, wherein the synthesis prediction performs synthesis processing of synthesizing a predicted image of an inter prediction and a predicted image of an intra prediction to an encoding-target block; and an encoding step of encoding a difference between the predicted image generated in the predicted image generation step and a pixel value of an image of the encoding-target block, wherein types of the predictions that can be used in the predicted image generation step include an angular prediction, a DC prediction, and a planar prediction, the synthesizing processing includes weighting processing performed to the predicted image of the inter prediction and the predicted image of the intra prediction, processing states of the weighting processing includes a state of setting the smallest weighting for the predicted image of the intra prediction while the type of the intra prediction is the planar prediction, and a prediction direction can be identified by a number among a series of numbers corresponding to a plurality of prediction directions for the angular prediction in the prediction image generation step.

2. An image decoding method for decoding an encoded stream obtained by encoding an image, the image decoding method comprising:

a predicted image generation step of generating a predicted image by a plurality of types of predicted image generating processing, the plurality of types of predicted image generating processing include an intra prediction, an inter prediction, and a synthesis prediction, wherein the synthesis prediction performs synthesis processing of synthesizing a predicted image of an inter prediction and a predicted image of an intra prediction to a decoding-target block; and a decoded image generation step of generating a decoded image based on the predicted image generated in the predicted image generation step and a difference image of the decoding-target block, wherein types of the predictions that can be used in the predicted image generation step include an angular prediction, a DC prediction, and a planar prediction, the synthesizing processing includes weighting processing performed to the predicted image of the inter prediction and the predicted image of the intra prediction, processing states of the weighting processing includes a state of setting the smallest weighting for the predicted image of the intra prediction while a type of the intra prediction is the planar prediction, and a prediction direction can be identified by a number among a series of numbers corresponding to a plurality of prediction directions for the angular prediction in the prediction image generation step.

3. An image encoding method for encoding an image, comprising:

generating a predicted image by a plurality of types of predicted image generating processing, the plurality of types of predicted image generating processing include an intra prediction, an inter prediction, and a synthesis prediction, wherein the synthesis prediction performs synthesis processing of synthesizing a predicted image of an inter prediction and a predicted image of an intra prediction to an encoding-target block; and encoding a difference between the predicted image generated and a pixel value of an image of the encoding-target block, wherein types of the predictions that can be used in generating the predicted image include an angular prediction, a DC prediction, and a planar prediction, the synthesizing processing includes weighting processing performed on the predicted image of the inter prediction and the predicted image of the intra prediction, the weighting processing includes setting a weighting for the predicted image of the intra prediction to be the smallest under the condition of that the type of the intra prediction being the planar prediction, and a prediction direction can be identified by a number among a series of numbers corresponding to a plurality of prediction directions for the angular prediction.

4. An image decoding method for decoding an encoded stream obtained by encoding an image, the image decoding method comprising:

generating a predicted image by a plurality of types of predicted image generating processing, the plurality of types of predicted image generating processing include an intra prediction, an inter prediction, and a synthesis prediction, wherein the synthesis prediction performs synthesis processing of synthesizing a predicted image of an inter prediction and a predicted image of an intra prediction to a decoding-target block; and generating a decoded image based on the predicted image generated in the predicted image generation and a difference image of the decoding-target block, wherein types of the predictions that can be used in generating the predicted image include an angular prediction, a DC prediction, and a planar prediction, the synthesizing processing includes weighting processing performed to the predicted image of the inter prediction and the predicted image of the intra prediction, the weighting processing includes setting a weighting for the predicted image of the intra prediction to be the smallest under the condition of that the type of the intra prediction being the planar prediction, and a prediction direction can be identified by a number among a series of numbers corresponding to a plurality of prediction directions for the angular prediction.

5. An image decoding apparatus for decoding an image, comprising:

circuitry configured to:

generate a predicted image by a plurality of types of predicted image generating processing, the plurality of types of predicted image generating processing include an intra prediction, an inter prediction, and a synthesis prediction, wherein the synthesis prediction performs synthesis processing of synthesizing a predicted image of an inter prediction and a predicted image of an intra prediction to a decoding-target block; and generate a decoded image based on the predicted image generated in the predicted image generation and a difference image of the decoding-target block, wherein types of the predictions that can be used in generating the predicted image include an angular prediction, a DC prediction, and a planar prediction, the synthesizing processing includes weighting processing performed on the predicted image of the inter prediction and the predicted image of the intra prediction, the weighting processing includes setting a weighting for the predicted image of the intra prediction to be the smallest under the condition of that the type of the intra prediction being the planar prediction, and a prediction direction can be identified by a number among a series of numbers corresponding to a plurality of prediction directions for the angular prediction.

* * * * *